(12) United States Patent
P J

(10) Patent No.: US 12,476,976 B2
(45) Date of Patent: Nov. 18, 2025

(54) MANAGING SECURITY PROFILES IN CONTENT DELIVERY NETWORKS

(71) Applicant: Salesforce, Inc., San Francisco, CA (US)

(72) Inventor: Jose Lejin P J, Bengaluru (IN)

(73) Assignee: Salesforce, Inc., San Francisco, CA (US)

( * ) Notice: Subject to any disclaimer, the term of this patent is extended or adjusted under 35 U.S.C. 154(b) by 63 days.

(21) Appl. No.: 18/429,062

(22) Filed: Jan. 31, 2024

(65) Prior Publication Data

US 2025/0247395 A1 Jul. 31, 2025

(51) Int. Cl.
*H04L 9/40* (2022.01)
(52) U.S. Cl.
CPC .................. *H04L 63/102* (2013.01)
(58) Field of Classification Search
CPC ............... H04L 63/102; H04L 9/40
See application file for complete search history.

(56) References Cited

U.S. PATENT DOCUMENTS

| | | | |
|---|---|---|---|
| 9,838,407 B1 * | 12/2017 | Oprea | H04L 63/1416 |
| 11,520,459 B1 | 12/2022 | Lejin | |
| D998,633 S | 9/2023 | P J | |
| 11,750,460 B1 | 9/2023 | Lejin | |
| D1,002,666 S | 10/2023 | P J | |
| 11,922,003 B2 | 3/2024 | Lejin | |
| D1,031,748 S | 6/2024 | P J | |
| D1,031,749 S | 6/2024 | P J | |
| D1,031,764 S | 6/2024 | P J et al. | |
| 12,147,820 B2 | 11/2024 | Lejin | |
| 12,177,361 B2 | 12/2024 | Lejin | |
| 12,255,872 B2 | 3/2025 | Lejin | |
| 12,255,925 B2 | 3/2025 | Monni et al. | |
| 12,261,874 B2 | 3/2025 | Lejin | |
| D1,077,837 S | 6/2025 | P J | |
| D1,082,824 S | 7/2025 | P J | |

(Continued)

OTHER PUBLICATIONS

OWASP Foundation, Inc., "OWASP Top Ten," downloaded Jan. 16, 2024 from https://owasp.org/www-project-top-ten/#, pp. 1-5.

(Continued)

*Primary Examiner* — Frantz B Jean
(74) *Attorney, Agent, or Firm* — Nicholson, De Vos, Webster & Elliott, LLP

(57) ABSTRACT

A method to manage domain-based security profiles in a content delivery network (CDN) is disclosed. The method includes receiving security events detected by one or more security solutions implemented by one or more CDN instances of the CDN, determining, for each of a plurality of domains, a risk score for the domain based on the security events, determining possible next level domains for a CDN instance of the CDN, determining an updated order of an auto-adjusting list maintained by the CDN instance based on risk scores for the domains included in the auto-adjusting list and the possible next level domains for the CDN instance, and sending an update to the CDN instance to cause the CDN instance to update the order of the auto-adjusting list to reflect the updated order, wherein the order of the auto-adjusting list indicates an eviction priority for the domains included in the auto-adjusting list.

20 Claims, 10 Drawing Sheets

(56) References Cited

U.S. PATENT DOCUMENTS

| | | | |
|---|---|---|---|
| 2018/0027006 A1* | 1/2018 | Zimmermann | H04L 63/0227 |
| | | | 726/11 |
| 2019/0104103 A1* | 4/2019 | Newton | H04L 61/50 |
| 2023/0308442 A1 | 9/2023 | Lejin | |
| 2024/0134511 A1 | 4/2024 | Lejin et al. | |
| 2024/0205287 A1 | 6/2024 | Lejin | |
| 2024/0259380 A1 | 8/2024 | Badola et al. | |
| 2024/0259430 A1 | 8/2024 | P J et al. | |
| 2024/0356854 A1 | 10/2024 | Sowpati et al. | |
| 2025/0080496 A1 | 3/2025 | P J et al. | |
| 2025/0158951 A1 | 5/2025 | P J | |
| 2025/0168146 A1 | 5/2025 | P J | |

OTHER PUBLICATIONS

Wikipedia, "Content delivery network," last edited Dec. 28, 2023, downloaded Jan. 16, 2024 from https://en.wikipedia.org/wiki/Content_delivery_network, pp. 1-13.

* cited by examiner

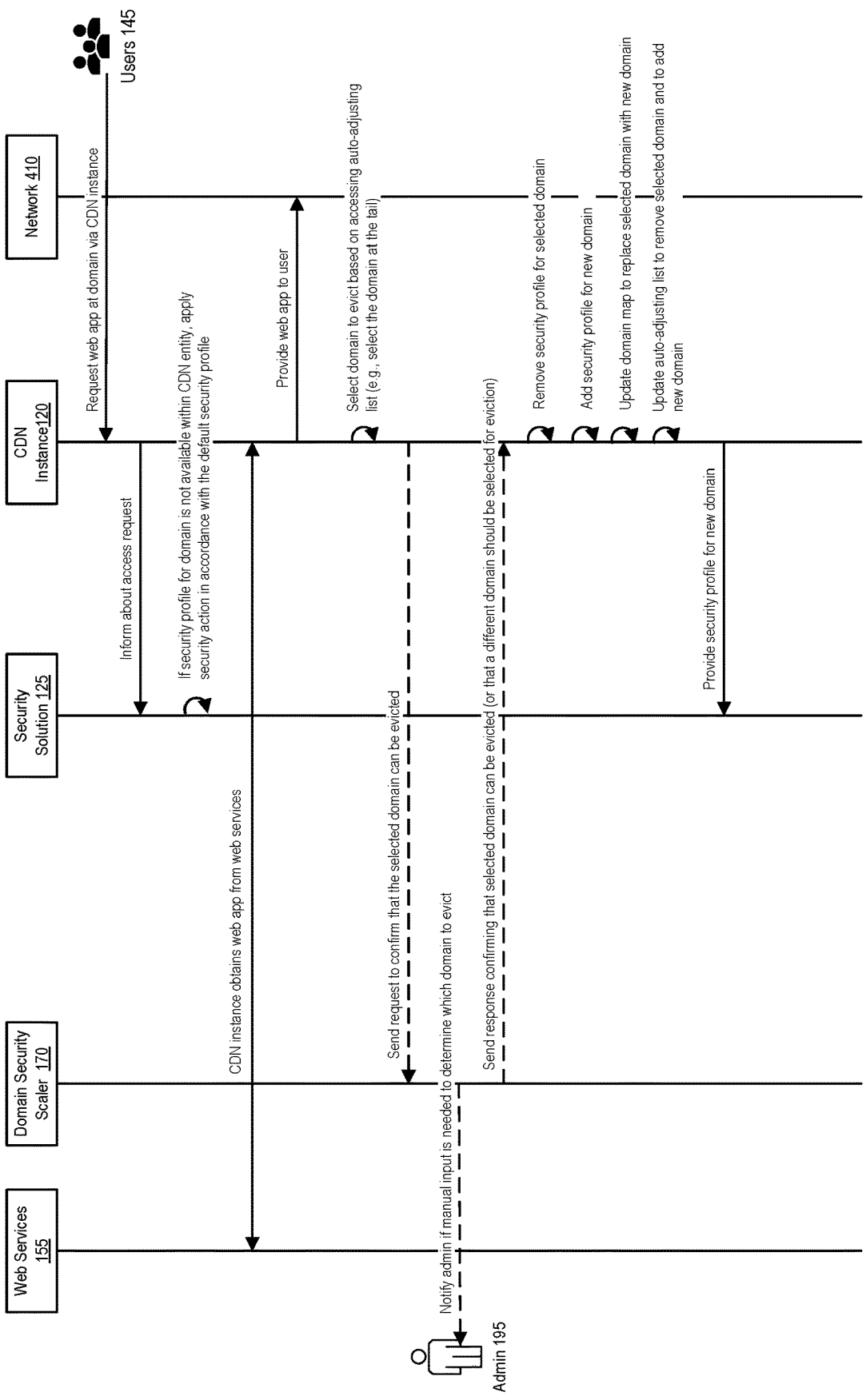

MANAGING SECURITY PROFILES IN CONTENT DELIVERY NETWORKS

TECHNICAL FIELD

One or more implementations relate to the field of content delivery networks (CDNs), and more specifically, to managing security profiles used by security solutions of CDNs.

BACKGROUND

A content delivery network (CDN) is a geographically distributed network of servers that store cached versions of content/assets (e.g., web application content/assets). One of the primary goals of a CDN is to provide faster content delivery to end users. A CDN may include multiple CDN instances that are distributed across various geographic regions. A CDN instance may implement a security solution such as a web application firewall (also commonly referred to as a "WAF") to monitor and/or filter traffic arriving at the CDN instance. The security solution may apply security actions to traffic in accordance with a security profile. A security profile may indicate the security actions to apply to different types of traffic (e.g., block certain traffic or return an error page). A different security profile may be assigned to each domain to customize the security actions on a per domain basis. The CDN may need to handle traffic associated with many domains (e.g., in the realm of millions of domains). Each CDN instance of the CDN may expect to receive traffic associated with any of the domains. Thus, to provide security actions on a per domain basis, each CDN instance of the CDN (and more specifically the security solution of the CDN instance) may need to hold the security profiles for all possible domains. However, it is often not feasible for the security solution of a given CDN instance to be able to hold the security profiles for all possible domains, particularly when the number of domains that need to be handled by the CDN is large.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
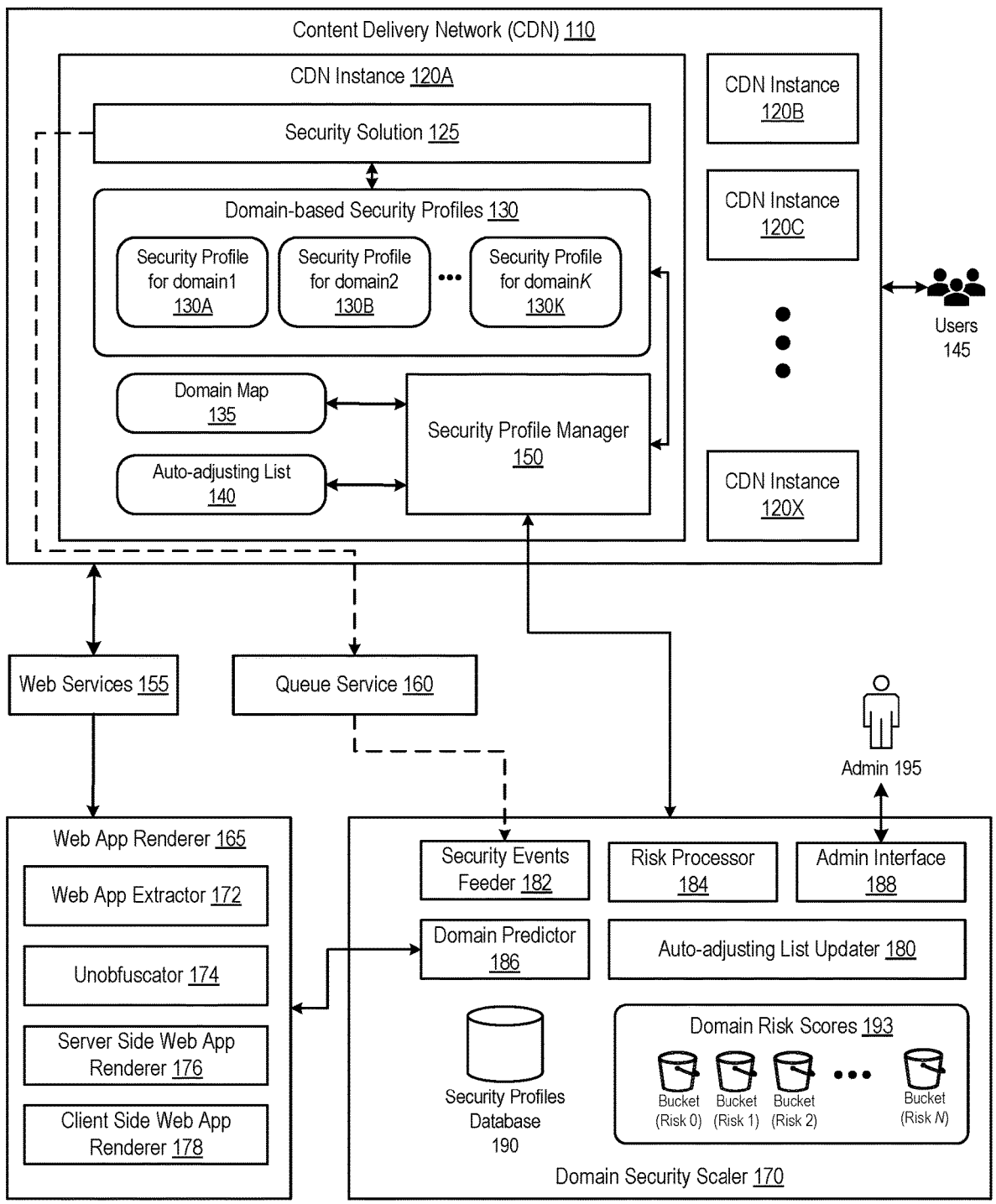
FIG. 1 is a diagram showing a system in which domain-based security profiles can be managed, according to some implementations.

The following description describes implementations for managing domain-based security profiles used by security solutions of a content delivery network (CDN).

As mentioned above, to provide security actions on a per domain basis, each CDN instance of a CDN (and more specifically the security solution of the CDN instance) may need to hold the security profiles for all possible domains. However, it is often not feasible for the security solution of a given CDN instance to be able to hold the security profiles for all possible domains, particularly when the number of domains that need to be handled by the CDN is large.

One approach to deal with this problem is to assign different sets of domains to different CDN instances of the CDN so that each CDN instance is only responsible for a subset of the domains. However, this may complicate the CDN configuration and deployment, and degrade the performance of the CDN (e.g., as traffic associated with a particular domain needs to be redirected to the CDN instance that is responsible for that domain). Another approach to deal with this problem is for each CDN instance to hold a limited set of security profiles and to evict the least-recently used domain and its corresponding security profile when a new domain and its corresponding security profile needs to be added. However, this approach may result in evicting a domain that is considered a high security risk and/or that has a high probability of being accessed soon, which increases the security risk and/or increases overhead/latency (e.g., due to having to frequently evict and add domains and their corresponding security profiles). Another approach is for the CDN to have a single security profile that is used for all domains. However, with this approach, security profiles cannot be customized on a per domain basis, losing flexibility/customizability of the security solution. Also, the same security profile rules may not work with all domains and can break some domain web applications.

Implementations are described herein that allow a CDN to use a virtually unlimited number of domain-based security profiles without significantly degrading the CDN performance, which allows the CDN to simultaneously provide high security and high performance, along with customized security profiles for each domain. According to implementations, a CDN instance of a CDN may hold a limited set of security profiles for a limited set of domains. The CDN instance may maintain a domain map and an auto-adjusting list. The domain map may include mappings between the set of domains and the corresponding security profiles for those domains. The auto-adjusting list may be a list of the same domains included in the domain map. The order of the auto-adjusting may indicate an eviction priority for the domains. When the CDN instance receives traffic associated with a domain, it may determine whether a security profile for the domain is available within the CDN instance (determine whether the CDN instance currently holds the security profile for the domain). If so, the security solution of the CDN instance may apply security actions to the traffic associated with the domain in accordance with the security profile for the domain. Otherwise, if the security profile for the domain is not available within the CDN instance (and thus the domain is considered to be a "new domain" for the CDN instance), the security solution of the CDN instance may initially apply security actions to the traffic associated with the new domain in accordance with a default security profile (so as not to delay processing of the traffic and to provide at least some level of default security). The CDN instance may then select a domain to evict from the CDN instance based on accessing the auto-adjusting list (to make space for the new domain and its corresponding security profile). In an implementation, the domain at the tail of the auto-adjusting list has the highest eviction priority (and the domain at the head of the auto-adjusting list has the lowest eviction priority). Thus, the CDN instance may decide to evict the domain at the tail of the auto-adjusting list. The CDN instance may remove the security profile for the selected domain from the CDN instance. The CDN instance may then obtain the security profile for the new domain. The CDN instance may update the domain map to include a mapping between the new domain and the security profile for the new domain. Also, the CDN instance may update the auto-adjusting list to remove the selected domain and to add the new domain. Thereafter, the security solution of the CDN instance may apply security actions to traffic associated with the new domain in accordance with the security profile for the new domain. The CDN instance may continually and asynchronously update the order of the auto-adjusting list based on updates received from a domain security scaler.

The domain security scaler may receive security events detected by one or more security solutions implemented by various CDN instances of the CDN and determine risk scores for domains based on analyzing the security events. The risk score for a domain may indicate the security risk posed by the domain. The domain security scaler may also determine possible next level domains for one or more CDN instance of the CDN. The possible next level domains for a CDN instance are domains that are reachable from a web application recently accessed via the CDN instance (e.g., domains that can be reached via hyperlinks included in a recently-accessed web application). The domain security scaler may determine an updated order of an auto-adjusting list maintained by a particular CDN instance based on the risk scores for the domains included in the auto-adjusting list and the possible next level domains for the CDN instance (e.g., such that domains that pose a lower security risk and that are not possible next level domains (and thus have a lower probability of being accessed soon) are positioned near the tail of the auto-adjusting list). The domain security scaler may cause the CDN instance to update the order of its auto-adjusting list to reflect the updated order. The domain security scaler may continually and asynchronously update the order of the auto-adjusting list maintained by the CDN instance in a similar manner as described above based on the changing risk scores for the domains and the changing possible next level domains for the CDN instance, such that low risk domains and/or domains that are not next level domains get evicted/replaced before other domains.

Implementations allow a CDN to be able to use a virtually unlimited number of security profiles, which allows the security solution of the CDN to customize the security actions on a per domain basis, even when the CDN has to handle a large number of domains (e.g., millions of domains). When a CDN instance needs to add a new security profiles for a new domain being accessed via the CDN instance, implementations allow the CDN instance to quickly identify and evict a domain that poses a lower security risk and that has a lower probability of being accessed soon, which increases the level of security provided by the CDN (e.g., by holding on to security profiles for domains that pose a higher security risk) and reduces the overall overhead/latency involved with updating the security profiles maintained by the CDN instance (e.g., by avoiding evicting domains that are likely to be accessed soon). Since implementations perform various operations asynchronously (e.g., operations related to sending security events and/or operations related to updating the order of the auto-adjusting list can be performed asynchronously), they can provide one or more of the aforementioned technological advantages without significantly impacting the performance of the CDN. While certain advantages are mentioned above, one of ordinary skill in the relevant art will appreciate that the implementations described herein can provide other advantages in view of the present disclosure. Implementations are further described herein with reference to the accompanying figures.

FIG. 1 is a diagram showing a system in which domain-based security profiles can be managed, according to some implementations.

As shown in the diagram, the system includes a CDN 110 and a domain security scaler 170. The CDN 110 may include one or more CDN instances 120 such as CDN instances 120A to 120X. CDN instance 120A is shown in the diagram as including a security solution 125 and a security profile manager 150. The other CDN instances 120B-X may include similar components as CDN instance 120A and operate similarly to CDN instance 120A, but the descriptions below primarily focus on the operations of CDN instance 120A to avoid redundancy of explanation. Each CDN instance 120 may be implemented by a computing system (e.g., including one or more network devices).

The security solution 125 may apply security actions to traffic received by CDN instance 120A to protect against various network and web application attacks (e.g., cross-site scripting (XSS) attacks, structured query language (SQL) injection attacks, cross-site request forgery (CSRF) attacks, cascading style sheet (CSS) attacks, Denial-of-service (DoS) attacks etc.). In an implementation, the security solution 125 is a web application firewall (WAF), although other types of security solutions can be used. The security solution 125 may have access to domain-based security profiles 130. The domain-based security profiles 130 may include security profiles for multiple domains. For example, as shown in the diagram, the domain-based security profiles 130 include a security profile for "domain1" 130A, a security profile for "domain2" 130B, and a security profile for "domainK" 130K. The domain-based security profiles 130 may include other security profiles for other domains as depicted by the ellipsis in the diagram. A security profile 130 for a domain may indicate the security actions that the security solution 125 is to apply to traffic associated with the domain. For example, security profile 130A may indicate the security actions to apply to traffic associated with "domain1," security profile 130B may indicate the security actions to apply to traffic associated with "domain2," and security profile 130K may indicate the security actions to apply to traffic associated with "domainK." A domain may be any identifier that identifies a web application, a sub-component of a web application, or other network resource. In an implementation, the domain is a uniform resource locator (URL). The security solution 125 may apply security actions to traffic associated with a domain in accordance with the security profile for the domain. Thus, the security solution 125 may apply security actions that are customized on a per-domain basis. It is noted that the CDN instance 130 may only hold a limited number of security profiles 130 at a given time (e.g., due to storage, resource, and/or performance constraints). In the example shown in the diagram, CDN instance 120A is able to hold a maximum of K security profiles at any given time. Thus, only K security profiles are available within CDN instance 120A at any given time.

The security profile manager 150 may manage the security profiles held at CDN instance 120A. In an implementation, the security profile manager 150 is a plugin that is installed in CDN instance 120A. The security profile manager 150 plugin may be compatible with a variety of types of CDNs and security solutions. The security profile manager 150 may provide mappings between domains and corresponding security profiles to the security solution 125 so that the security solution 125 knows which security profiles to use for which domains.

In an implementation, the security profile manager 150 provides the mappings between domains and the corresponding security profiles to the security solution 125 in a YAML (Yet Another Markup Language) format or other structured format. For example, the mappings between domains and security profiles may be provided as follows:

name: domains-profile-mapping
    mapping:
      domains:
        domain1.com
        profile: security-profile1
      domains:
        domain2.com
        profile: security-profile2
      domains:
        domain3.com
        domain4.com
        domain5.com
        profile: default-security—profile In the example mapping provided above, "domain1.com" is mapped to "security-profile1," "domain2.com" is mapped to "security-profile2," and "domain3.com," "domain 4.com," and "domain5.com" are mapped to "default-security-profile." As shown in this example, it is possible for multiple domains to be mapped to the same security profile.

As mentioned above, each security profile 130 may indicate the security actions to apply to traffic. The structure/format of the security profile 130 may depend on the specific implementation of the security solution 125. An example security profile is shown below:

name: security-profile1
    driver: L7WAF
    metadata:
      key1: value1
      key2: value2
    policy:
      classifiers:
        hostname:
        id: classifier-1
        path:
          operand: Prefix
          value: /
        protectionId: protection-1 (type of protection to apply)
        name: security-profile-policy1
        operatorEmail: waf@domain.com
        protections:
          expressions:
            opMode: Passive
          id: protection-1
          signatures:
            opMode: Active In the above example, the name of the security profile is "security-profile1." The security profile defines a classifier for classifying the traffic that is to be protected ("classifier-1") and defines protections to apply to this traffic ("protection-1"). The protection operation mode can be active ("opMode: Active"—detect and block) or passive ("opMode: Passive"-detect but do not block).

The security profile manager 150 may maintain a domain map 135 and an auto-adjusting list 140. The domain map 135 may include mappings between domains and the corresponding security profiles. The auto-adjusting list 140 may be a list of domains included in the domain map 135, that are ordered in order of eviction priority. As previously mentioned, a given CDN instance 120A may only hold a limited number of security profiles 130 at a given time (e.g., due to storage/resource/performance constraints). The domain map 135 and the auto-adjusting list 140 may include the domains that are currently held by the CDN instance 120A. As will be described in additional detail herein, the CDN instance 120A may update the domain map 135 and the auto-adjusting list 140 as existing domains are evicted and new domains are added.

CDN instance 120A may receive traffic from users 145 accessing web applications hosted/served by web services component 155 (e.g., through a domain name service (DNS) redirect). When CDN instance 120A receives traffic associated with a particular domain, it may determine whether a security profile for the domain is available within CDN instance 120A (e.g., by consulting the domain map 135). If the security profile for the domain is available within CDN instance 120A, the security solution 125 of CDN instance 120A may apply security actions to the traffic associated with the domain in accordance with the security profile for the domain. Otherwise, if the security profile for the domain is not available within CDN instance 120A (and thus the domain is considered to be a "new domain" for the CDN instance), the security solution 125 may initially apply security actions to the traffic associated with the new domain in accordance with a default security profile (so as not to delay processing of the traffic and provide at least some level of default security). Applying immediate security actions is important since performance is one of the primary reasons for using a CDN 110. The security profile manager 150 of CDN instance 120A may then select a domain to evict (to make space for the new domain and its corresponding security profile) based on accessing the auto-adjusting list 140. In an implementation, the domain at the tail of the auto-adjusting list 140 has the highest eviction priority (and the domain at the head of the auto-adjusting list 140 has the lowest eviction priority). Thus, the security profile manager 150 may decide to evict the domain at the tail of the auto-adjusting list 140. The security profile manager 150 may remove the security profile for the selected domain from CDN instance 120A (e.g., delete the security profile from the domain-based security profiles 130). The security profile manager 150 may then obtain the security profile for the new domain (e.g., from the domain security scaler 170). The security profile manager 150 may update the domain map 135 to include a mapping between the new domain and the security profile for the new domain. Also, the security profile manager 150 may update the auto-adjusting list 140 to remove the selected/evicted domain and to add the new domain. In an implementation, the new domain takes the place of evicted domain in the auto-adjusting list 140 (e.g., the new domain is added to the same position in the auto-adjusting list 140 as the evicted domain), but in other implementations the new domain is inserted into a position in the auto-adjusting list based on its risk score and whether it is a possible next level domain (and other existing domains in the auto-adjusting list are shifted accordingly). Thereafter, the security solution 125 of CDN instance 120A may apply security actions to traffic associated with the new domain in accordance with the security profile for the new domain. The security profile manager 150 may communicate with the domain security scaler 170 using a web socket communication or other suitable communication mechanism. As will be described in additional detail herein, the domain security scaler 170 may continually/periodically and asynchronously send updates to the security profile manager 150 to cause the security profile manager 150 to update the order of the auto-adjusting list 140.

In an implementation, the domain map includes links between domains included in the domain map and domains included in the auto-adjusting list. As mentioned above, when a new domain and its corresponding security profile are added, the domain map 135 and the auto-adjusting list 140 are updated to include the new domain. Also, a link may be created between the mapping for the new domain in the domain map 135 and the position of the new domain in the auto-adjusting list 140 (e.g., the links shown in FIG. 3).

The security solution 125 may send security events that it has detected and send them to a security events feeder 182 of the domain security scaler 170 via a queue service 160. The security events may indicate a negative security event (e.g., traffic contained malicious/suspicious content) or a positive security event (e.g., traffic did not contain any malicious/suspicious content). The security solution 125 may publish security events using a security events listener endpoints provided by the security solution 125. The security events may be sent to the security events feeder 182 asynchronously. The queue service 160 may be any type of message queueing service that provides communications between devices/components.

The domain security scaler 170 may help with scaling the number of security profiles 130 that can be used by CDN instances 120 and help CDN instances 120 with making domain eviction decisions. As shown in the diagram, the domain security scaler 170 includes a security events feeder 182, a risk processor 184, a domain predictor 186, an auto-adjusting list updater 180, and an admin interface component 188.

The admin interface component 188 may provide an admin interface that allows an administrator 195 of the CDN 110 to configure the domain security scaler 170. In an implementation, the admin interface allows the administrator 195 to provide the security profiles that are to be used in the CDN 110 as well as the mappings between domains and the corresponding security profiles. In an implementation, the admin interface allows the administrator 195 to provide a default security profile to be used in the CDN 110 (as described above, a CDN instance 120 may temporarily use the default security profile if a particular security profile for a domain is not available within the CDN instance 120). The security profiles themselves and the mappings between domains and security profiles may be stored in the security profiles database 190. The admin interface component 188 may be implemented as a REST (Representational State Transfer) endpoint, a graphical user interface, or other type of interface (e.g., a command line interface). The domain security scaler 170 may be implemented by a computing system (e.g., including one or more electronic/network devices). In an implementation, the domain security scaler 170 is implemented by a server, in a public cloud, or in a private cloud.

The security events feeder 182 may receive security events from the security solution 125 of CDN instance 120A (as well as security events from other security solutions of other CDN instances) via the queue service 160. The security events feeder 182 may extract security event parameters from the security events and provide them to the risk processor 184. The security event parameters may include various parameters related to the security events such as the domain associated with the security event (e.g., salesforce.com), the threat type, the threat criticality, and/or domain access location (e.g., the geographical location from which the user accessed the domain), just to name a few examples. The security events feeder 182 may be compatible with various types of security solutions (e.g., it is able to understand security events generated by various types of security solutions).

The risk processor 184 may determine risk scores 193 for domains based on the security event parameters received from the security events feeder 182. As shown in the diagram, in an implementation, the risk processor 184 assigns domains to buckets based on risk score. Each bucket is associated with a risk score. For example, in the example shown in the diagram, there are N buckets, where the first bucket is associated with risk score 0, the next bucket is associated with risk score 1, and so on. In this example, risk score 0 represents the highest risk and risk score N represents the lowest risk, but it should be appreciated that other implementations may use a different scoring convention. In an implementation, an administrator 195 is able to configure the number of buckets via the admin interface component 188. The number of buckets may correspond to the number of possible risk scores. It is noted that the number of buckets will typically be much smaller than the number of domains that can be handled by the CDN 110. The risk processor 184 may determine a risk score for a domain based on applying risk scoring rules to the security event parameters associated with that domain. In an implementation, the risk scoring rules may include condition rules and history rules. The condition rules may include rules that evaluate security risk based on conditions. For example, the condition rules may include rules that indicate that the risk score is 9 if the security event parameters indicate an XSS attack, the risk score is 8 if the security event parameters indicate a SQL injection attack, the risk score is 6 if the security event parameters indicate a CSRF attack, the risk score is 4 if the security event parameters indicate a CSS attack, etc. The history rules may be used in conjunction with condition rules and include rules that evaluate security risk based on historical trends. For example, the history rules may include a rule that indicate that a risk score should be modified to indicate a higher security risk if the security event parameters indicate that an XSS attack has been ongoing for a domain for a long duration (e.g., for a duration of 24 hours). As another example, the history rules may include a rule that indicates that a risk score should be modified to indicate a lower security risk if the security event parameters indicate that no attacks have occurred for over six months. In an implementation, the risk scoring rules are configured to give more weight to certain attacks that pose a greater security risk and/or that cannot be effectively neutralized by the security solution 125. In an implementation, the administrator 195 provides the risk scoring rules to the domain security scaler 170 via the admin interface component 188. The risk processor 184 may update the risk scores for domains over time as it receives additional security events associated with the domains. For example, the risk processor 184 may initially assign domain "xyz.com" to the risk bucket associated with risk N (lowest security risk), but then later assign the domain to the risk bucket associated with risk 0 (highest security risk) if the risk processor 184 receives security event parameters associated with the domain indicating that the domain has recently experienced a severe attack and/or has a critical security vulnerability.

The domain predictor 186 may determine possible next level domains for CDN instances 120. The possible next level domains for a CDN instance are domains that are reachable from web applications recently accessed via the CDN instance. What is considered recent for this purpose may depend on the specific implementation and may be configurable. The domain predictor 186 may request a web application renderer 165 to render the web application associated with a domain that has been recently accessed via a CDN instance 120 and determine the possible next level domains for the CDN instance 120 based on analyzing the rendered web application. As shown in the diagram, the web application renderer 165 includes a web application extractor 172, an unobfuscator 174, a server side web application renderer 176, and a client side web application renderer 178.

The web application extractor 172 may obtain the main contents of a web application from the web services component 155 that hosts/serves the actual web application.

Many web applications are compressed and/or obfuscated. The unobfuscator 174 may decompress and/or unobfuscate the contents of the web application if the contents are compressed or obfuscated.

Web applications can be rendered on the server side or the client side. The server side web application renderer 176 may perform server side rendering of the web application. The client side web application renderer 178 may perform client side rendering of the web application. In an implementation, the server side web application renderer 176 and the client side web application renderer 178 render the web application in parallel.

The web application renderer 165 may provide the rendered web application or a representation thereof to the domain predictor 186. The domain predictor 186 may determine the possible next level domains based on analyzing the rendered web application. For example, the domain predictor 186 may determine the possible next level domains by analyzing the hyperlinks included in the rendered web application (e.g., Hypertext Markup Language (HTML) "<a>" tags) to determine the domains that are reachable from the rendered web application via hyperlinks. In an implementation, the possible next level domains include more than one level of possible next level domains (e.g., the domain predictor 186 may render the web applications associated with the domains that can be reached from the initial web application and determine the domains that are reachable from the web applications associated with those domains). In an implementation, the administrator 195 is able to configure the number of levels for the possible next level domains via the admin interface component 188.

The auto-adjusting list updater 180 may determine an updated order for the auto-adjusting list 140 of a CDN instance 120 based on the risk scores associated with domains included in the auto-adjusting list 140 and the possible next level domains for the CDN instance 120. The domain security scaler 170 may send an update to the CDN instance 120 to cause the CDN instance 120 to update the order of its auto-adjusting list 140 to reflect the updated order. The domain security scaler 170 may continually/periodically update the order of the CDN instance's 120 auto-adjusting list 140 and send updates to the CDN instance 120 to cause the CDN instance 120 to update the order of its auto-adjusting list 140. Thus, the domains included in the auto-adjusting list 140 may be shuffled over time such that domains that are considered high risk and/or predicted to be accessed soon are assigned positions in the auto-adjusting list 140 with a lower eviction priority and domains that are considered low risk or not predicted to be accessed soon are assigned positions with higher eviction priority. It is noted that operations happen asynchronously, and thus the performance impact on the CDN instance 120 is minimal.

Implementations allow the CDN 110 to be able to use a virtually unlimited number of security profiles, which allows the CDN 110 to customize the security actions on a per-domain basis, even when the CDN has to handle a large number of domains (e.g., millions of domains). When a CDN instance 120 needs to add a new security profiles for a new domain being accessed via the CDN instance, implementations allow the CDN instance to quickly identify and evict a domain that poses a lower security risk and/or that has a lower probability of being accessed soon, which increases the level of security provided by the CDN (e.g., by holding on to security profiles for domains that pose a higher security risk) and reduces the overall overhead involved with updating security profiles maintained by the CDN instance (e.g., by avoiding evicting domains that are likely to be accessed soon). Since implementations perform various operations asynchronously (e.g., operations related to sending security events and/or operations related to updating the order of the auto-adjusting list can be performed asynchronously), they can provide one or more of the aforementioned technological advantages without significantly impacting the performance of the CDN. While implementations are described in the context of a CDN use case, it should be appreciated that the techniques described herein can be used to scale the number of domain-based security profiles in other types of distributed systems/deployments.

Figure 2:
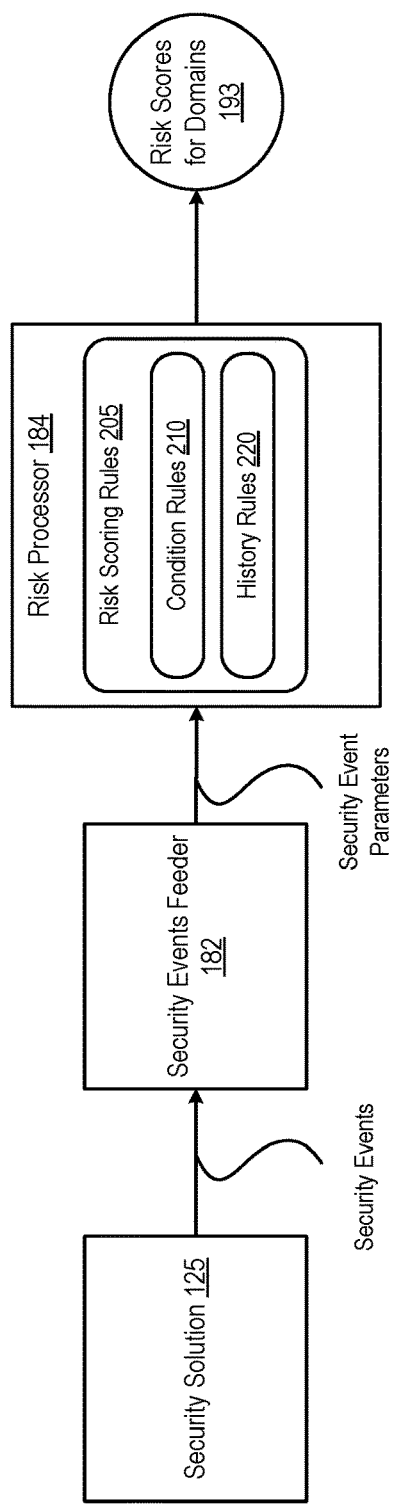
FIG. 2 is a diagram showing components involved in determining risk scores for domains, according to some implementations.

FIG. 2 is a diagram showing components involved in determining risk scores for domains, according to some implementations.

The security solution 125 implemented by a CDN instance 120 may generate security events (e.g., based on applying security rules to traffic) and send the security events to the security events feeder 182 of the domain security scaler 170. The security events feeder 182 may extract security event parameters from the security events, format the security event parameters into a format that is understandable by the risk processor 184, and send the security event parameters to the risk processor 184. The security events feeder 182 may be compatible with various types of security solutions such that it is able to extract security event parameters from security events generated by different types of security solutions. The risk processor 184 may apply risk scoring rules 205 to the security event parameters to determine the risk scores for domains 193. The risk scoring rules 205 may include condition rules 210 and history rules 220, as previously described.

Figure 3:
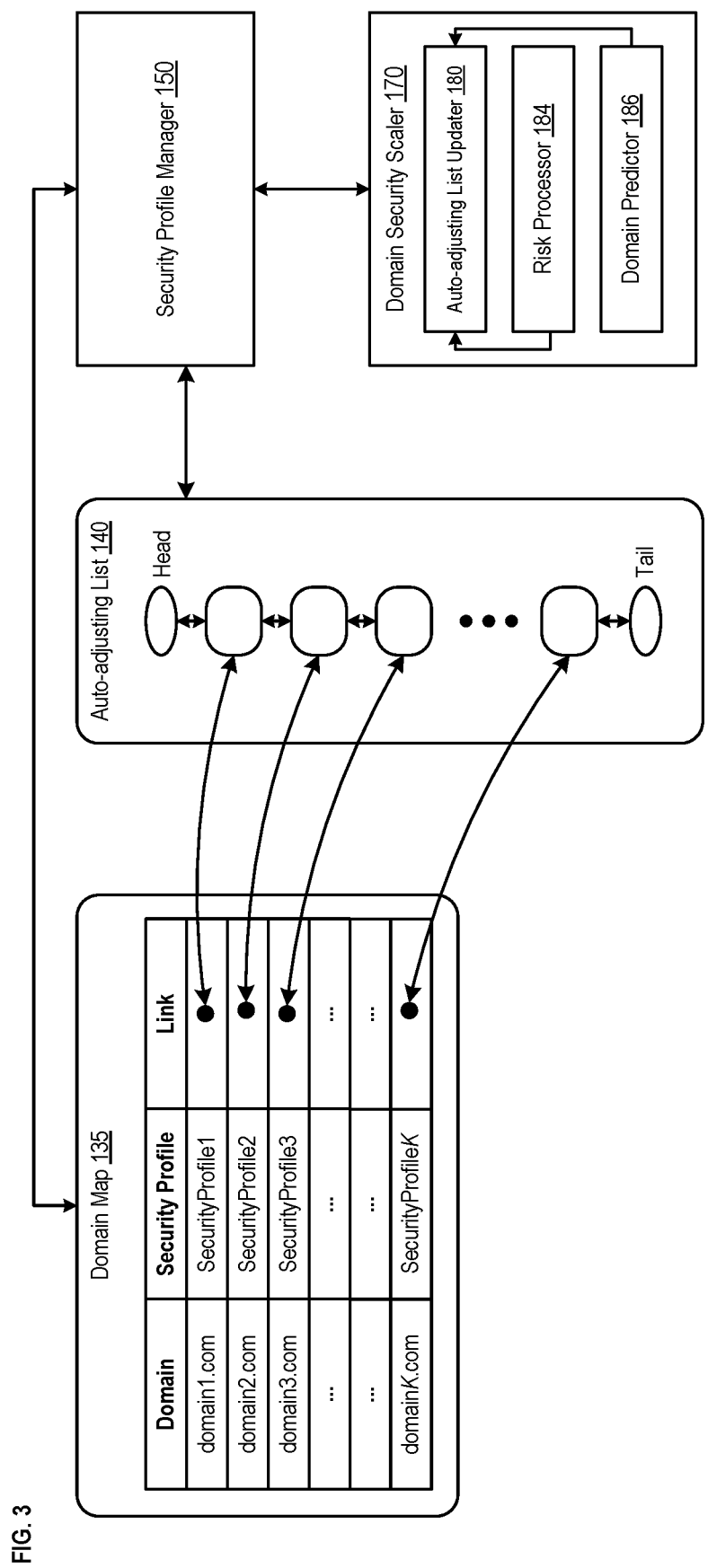
FIG. 3 is a diagram showing a domain map and an auto-adjusting list, according to some implementations.

FIG. 3 is a diagram showing a domain map and an auto-adjusting list, according to some implementations.

The domain map 135 includes mappings between domains and corresponding security profiles. For example, in the example shown in the diagram, the domain map 135 includes a mapping between "domain1.com" and "SecurityProfile1," a mapping between "domain2.com" and "SecurityProfile2," and so on.

The auto-adjusting list 140 includes a list of domains or references thereto. In an implementation, the auto-adjusting list 140 is implemented as a doubly-linked list. The doubly-linked list may include a head node and a tail node. The order of the auto-adjusting list 140 may indicate an eviction priority for the domains included in the list. In the example shown in the diagram, the first node in the auto-adjusting list 140 (the node closest to the head) represents "domain1.com," the next node in the auto-adjusting list 140 represents "domain2.com," and so on. In an implementation, the domain at the tail of the auto-adjusting list has the highest eviction priority (e.g., "14omain.com" has the highest eviction priority in the example shown in the diagram). As shown in the diagram, the domain map 135 includes links between domains included in the domain map 135 and domains included in the auto-adjusting list 140. These links may help with quickly finding entries corresponding to the same domain in the domain map 135 and the auto-adjusting list 140 without having to traverse the entries one-by-one.

As previously described, the auto-adjusting list updater 180 may periodically/continually determine an updated order for the auto-adjusting list 140 based on risk scores determined by the risk processor 184 and possible next level domains determined by the domain predictor 186. The domain security scaler 170 may then send updates to the security profile manager 150 of the CDN instance to cause the security profile manager 150 to update the order of the auto-adjusting list 140.

Also, as previously described, the security profile manager 150 may update the domain map 135 to remove an existing mapping and add a new mapping. Also, as previously described, the security profile manager 150 may update the auto-adjusting list 140 to remove an existing domain and add a new domain.

Figure 4:
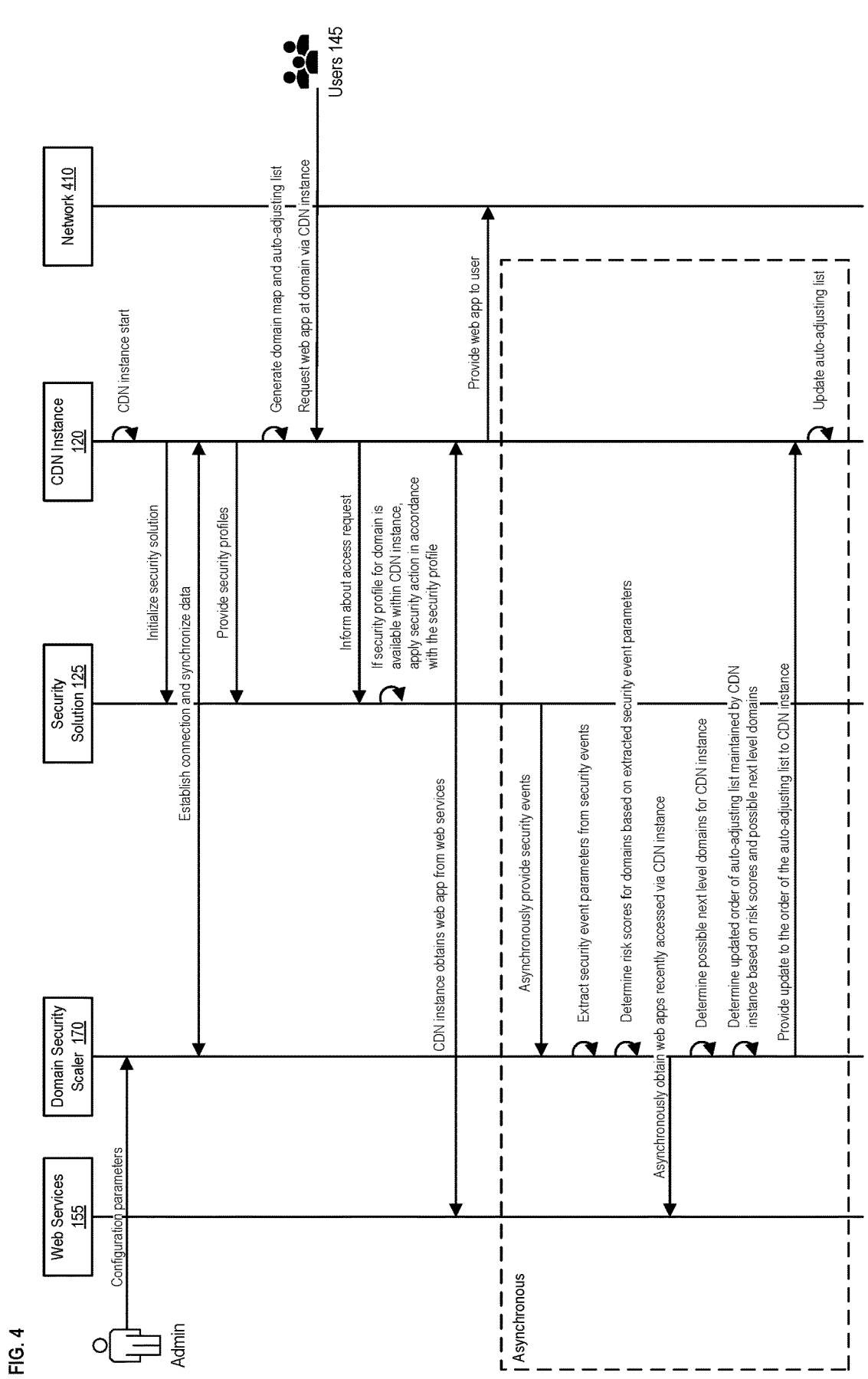
FIG. 4 is a diagram showing component interactions for managing security profiles, according to some implementations.
Figure 4:
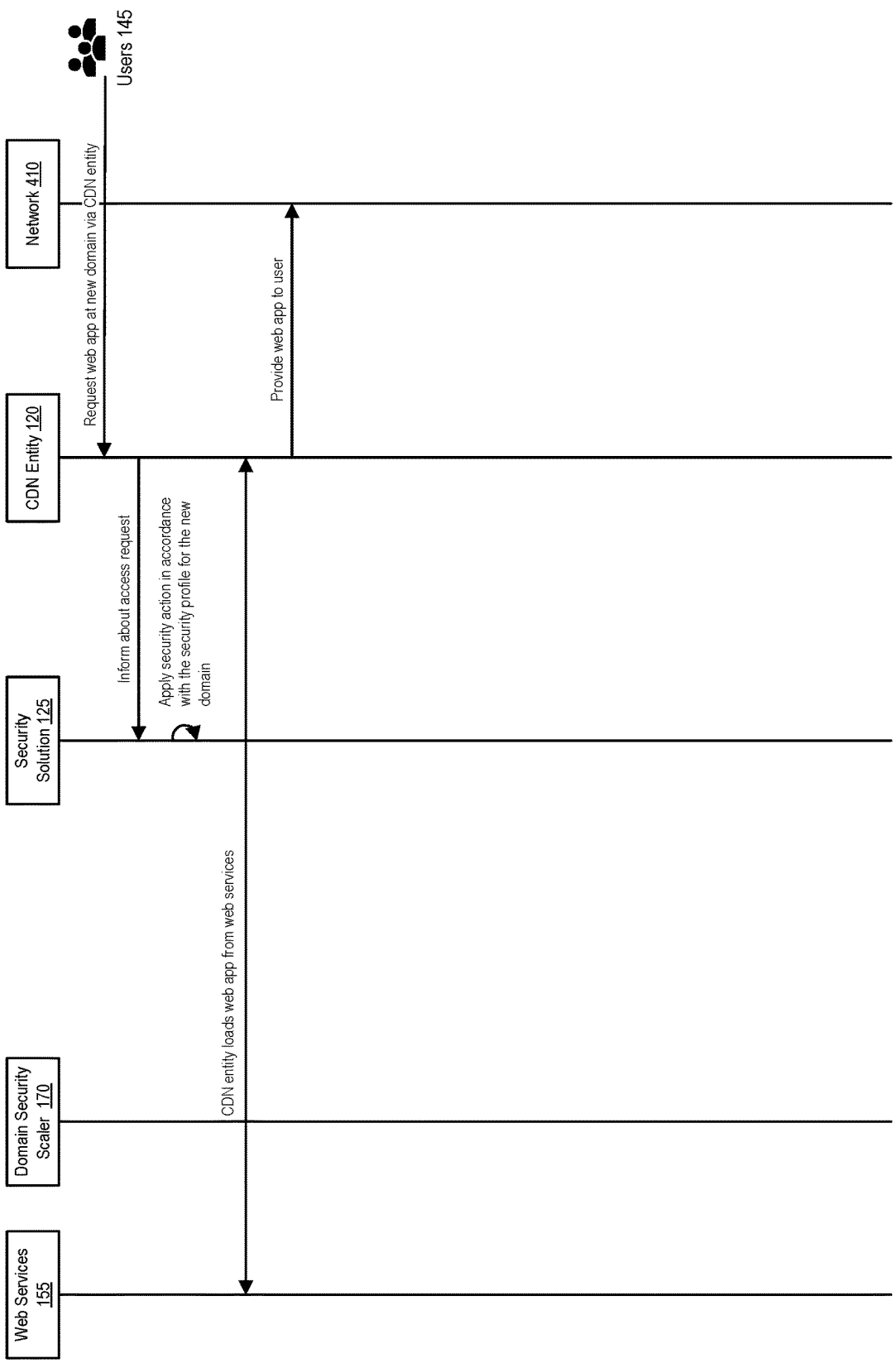

FIG. 4 is a diagram showing component interactions for managing security profiles, according to some implementations.

The administrator may provide configuration parameters to the domain security scaler 170 (e.g., via the admin interface component 188 of the domain security scaler 170).

Once the CDN instance 120 starts (e.g., boots up), it may initialize the security solution 125.

The CDN instance 120 may establish a connection with the domain security scaler 170 and synchronize data (e.g., the CDN instance 120 may receive an initial set of security profiles from the domain security scaler 170).

The CDN instance 120 may provide security profiles to the security solution 125 (and the mappings between domains and corresponding security profiles).

The CDN instance 120 may generate a domain map and an auto-adjusting list.

The CDN instance 120 may receive a request for a web application at a domain from one of the users 145. Responsive to receiving the request, the CDN instance 120 may inform the security solution 125 regarding the access request.

If a security profile associated with the domain is available within the CDN instance, then the security solution 125 may apply security actions to the traffic associated with the domain (including the user's request) in accordance with the security profile.

The CDN instance 120 obtains the web application from the web services component 155 and provides the web application to the user via the network 410. The security solution 125 may apply security actions to this traffic in accordance with the security profile associated with the domain.

The security solution 125 (as well as the security solutions implemented by other CDN instances) may asynchronously provide security events to the domain security scaler 170. The domain security scaler 170 may extract security event parameters from the security events and determine risk scores for domains based on the extracted security event parameters.

Also, the domain security scaler 170 may asynchronously obtain web applications recently accessed by the CDN instance 120 (as well as web applications recently accessed by other CDN instances) from the web services component 155 hosting/serving those web applications (or cause a web application renderer 165 to obtain the web applications).

The domain security scaler 170 may determine the possible next level domains for the CDN instance based on analyzing the rendered web applications.

The domain security scaler 170 may determine an updated order of the auto-adjusting list maintained by the CDN instance 120 (as well as other CDN instances) based on the risk scores and the possible next level domains, as previously described.

The domain security scaler 170 may provide an update to the order of the auto-adjusting list 140 to the CDN instance 120 (as well as to other CDN instances).

The CDN instance 120 may update its auto-adjusting list in response to receiving the update from the domain security scaler 170.

Subsequently, the CDN instance 120 may receive a request for a web application at a domain from one of the users 145. Responsive to receiving the request, the CDN instance 120 may inform the security solution 125 regarding the access request.

If a security profile associated with the domain is not available within the CDN instance, then the security solution 125 may apply security actions to the traffic associated with the domain (including the user's request) in accordance with the default security profile.

The CDN instance 120 may obtain the web application from the web services component 155 and provide the web application to the user via the network 410. The security solution 125 may apply security actions to this traffic in accordance with the default security profile.

The CDN instance 120 may select a domain to evict based on accessing its auto-adjusting list. For example, the CDN instance 120 may select the domain at the tail of the auto-adjusting list (assuming that the tail of the auto-adjusting list corresponds to the highest eviction priority). In some cases, if the tail of the auto-adjusting list 140 is not accessible (e.g., because the tail memory is temporarily locked due to the domain at the tail being updated/shuffled), the CDN instance 120 may select the next domain in the auto-adjusting list 140.

In an implementation, the CDN instance 120 sends a request to the domain security scaler 170 to confirm that the selected domain can be evicted. If the domain security scaler 170 determines that the selected domain can be evicted, then the domain security scaler 170 may send a response to the CDN instance 120 confirming that the selected domain can be evicted. Otherwise, if the domain security scaler 170 determines that the selected domain should not be evicted, then the domain security scaler 170 may select a different domain that should be evicted from the CDN instance 120 and send a response to the CDN instance 120 indicating as such. In an implementation, the domain security scaler 170 notifies a CDN administrator 195 if manual input is needed from the administrator 195 to determine which domain to evict, in case all domains are found risky and/or to be possible next level domains.

The CDN instance 120 may remove the security profile for the selected domain (the domain selected for eviction), obtain the security profile for the new domain (e.g., from the domain security scaler 170), and add the security profile for the new domain. Also, the CDN instance 120 may update its domain map to replace the selected domain with the new domain and update its auto-adjusting list to remove the selected domain and to add the new domain.

The CDN instance 120 may provide the security profile for the new domain to the security solution 125 so that the security solution 125 can apply security actions to traffic associated with the new domain in accordance with the security profile for the new domain.

Subsequently, the CDN instance 120 may receive another request for a web application at the new domain from one of the users 145 (which can be the same user or a different user from the user that sent the first request). Responsive to receiving the request, the CDN instance 120 may inform the security solution 125 regarding the access request.

Since the security profile associated with the new domain is available within the CDN instance 120, the security solution 125 may apply security actions to the traffic associated with the new domain (including the user's request) in accordance with a default security profile.

The CDN instance 120 may obtain the web application from the web services component 155 (and/or from the CDN instance's 120 cache) and provide the web application to the user via the network 410. The security solution 125 may apply security actions to this traffic in accordance with the security profile for the new domain (which is now available within the CDN instance 120).

Figure 5:
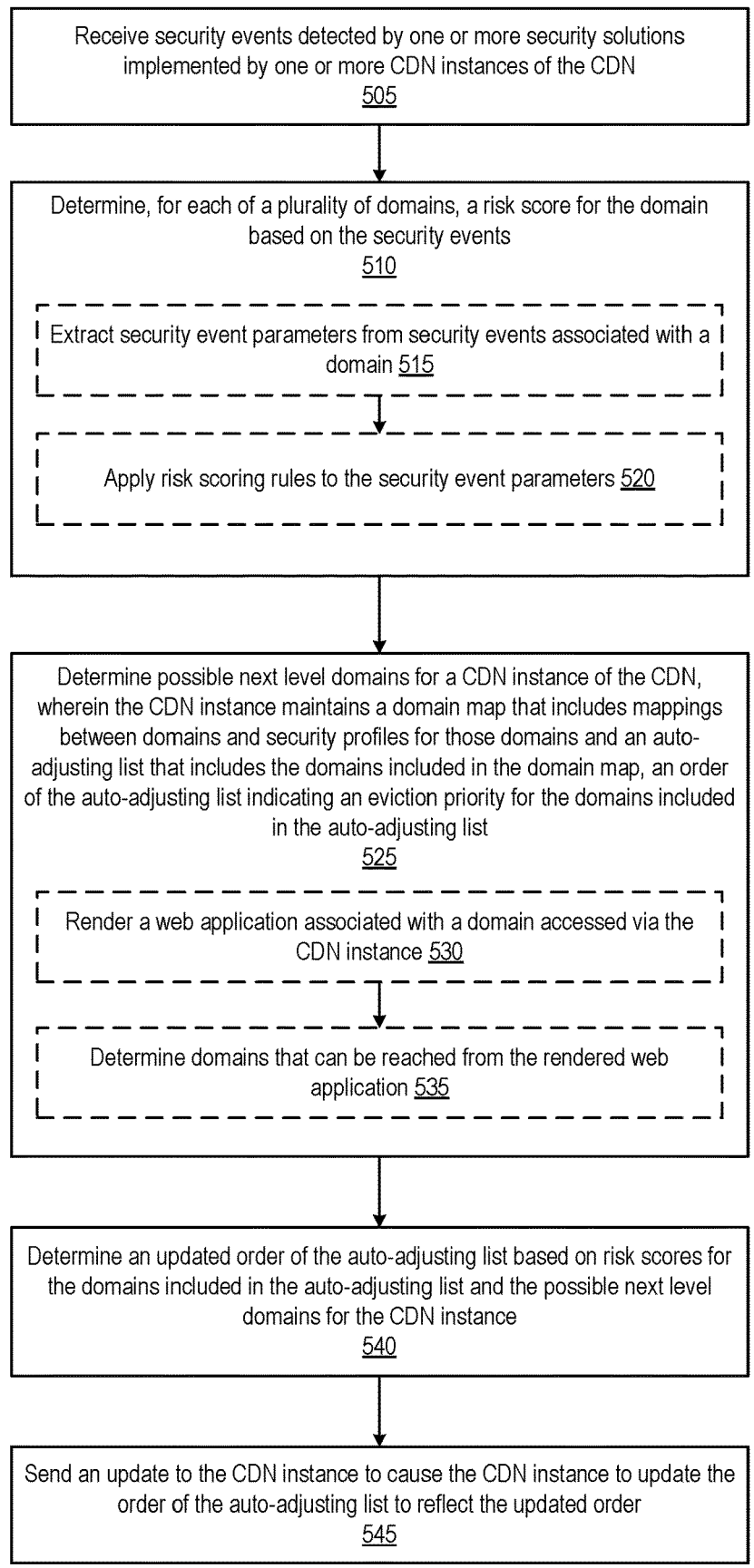
FIG. 5 is a flow diagram of a method for managing domain-based security profiles in a CDN, according to some implementations.

FIG. 5 is a flow diagram of a method for managing domain-based security profiles in a CDN, according to some implementations. In an implementation, the method is performed by a computing system that implements a domain security scaler 170. The method may be performed using hardware, software, firmware, or any combination thereof.

While the flow diagrams in the figures show a particular order of operations performed by certain implementations, such order is by way of example and not intended to be limiting (e.g., alternative implementations may perform the operations in a different order, combine certain operations, perform certain operations in parallel, overlap performance of certain operations such that they are partially in parallel, etc.).

At operation 505, the domain security scaler receives security events detected by one or more security solutions implemented by one or more CDN instances of the CDN.

At operation 510, the domain security scaler determines, for each of a plurality of domains, a risk score for the domain based on the security events. In an implementation, operation 510 involves operation 515 in which the domain security scaler extracts security event parameters from security events associated with a domain and operation 520 in which the domain security scaler applies risk scoring rules to the security event parameters to determine a risk score for the domain.

At operation 525, the domain security scaler determines possible next level domains for a CDN instance of the CDN. In an implementation, operation 525 involves operation 530 in which the domain security scaler renders a web application associated with a domain accessed via the CDN instance (e.g., which may involve server side rendering and/or client side rendering, as described elsewhere herein) and operation 535 in which the domain security scaler determines domains that can be reached from the rendered web application. In an implementation, the possible next level domains include more than one level of possible next level domains (e.g., which may be the domains that are reachable via hyperlinks from the found domains, and so on).

The CDN instance maintains a domain map that includes mappings between domains and security profiles for those domains and an auto-adjusting list that includes the domains included in domain map. The order of the auto-adjusting list indicates an eviction priority for the domains included in the auto-adjusting list.

At operation 540, the domain security scaler determines an updated order of the auto-adjusting list based on risk scores for the domains included in the auto-adjusting list and the possible next level domains for the CDN instance (e.g., based on conditions configured by the administrators).

At operation 545, the domain security scaler sends an update to the CDN instance to cause the CDN instance to update the order of the auto-adjusting list to reflect the updated order.

In an implementation, the domain security scaler sends a default security profile to the CDN instance (and possibly other CDN instances of the CDN), which can be temporarily used by the CDN instance when the CDN instance receives traffic associated with a new domain (a domain for which a corresponding security profile is not available within the CDN instance), as described elsewhere herein.

Figure 6A:
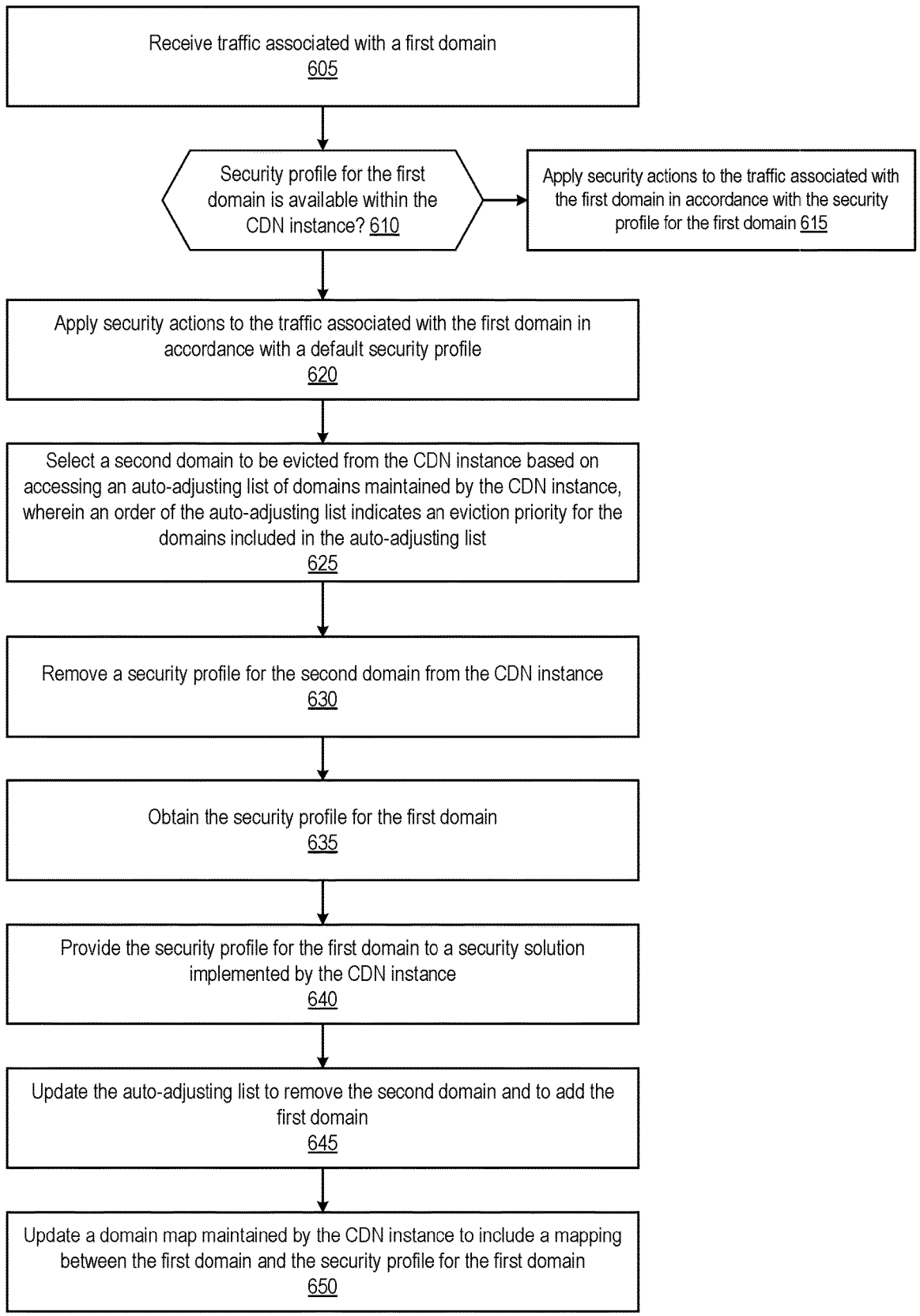
FIG. 6A is a flow diagram of a method for managing domain-based security profiles in a CDN instance, according to some implementations.

FIG. 6A is a flow diagram of a method for managing domain-based security profiles in a CDN instance, according to some implementations. In an implementation, the method is performed by a computing system that implements a CDN instance 120. The method may be performed using hardware, software, firmware, or any combination thereof.

At operation 605, the CDN instance receives traffic associated with a first domain.

At operation 610, the CDN instance determines whether a security profile for the first domain is available within the CDN instance. If the security profile for the first domain is available within the CDN instance, the flow moves to operation 615 in which the CDN instance (e.g., the security solution of the CDN instance) applies security actions to the traffic associated with the first domain in accordance with the security profile for the first domain. Otherwise, if the security profile for the first domain is not available within the CDN instance, the flow moves to operation 620.

At operation 620, the CDN instance (e.g., the security solution of the CDN instance) applies security actions to the traffic associated with the first domain in accordance with a default security profile.

At operation 625, the CDN instance selects a second domain to be evicted from the CDN instance based on accessing an auto-adjusting list of domains maintained by the CDN instance, wherein an order of the auto-adjusting list indicates an eviction priority for the domains included in the auto-adjusting list.

At operation 630, the CDN instance removes a security profile for the second domain from the CDN instance. In an implementation, the domain security scaler sends a request to a domain security scaler to confirm that the second domain can be evicted, wherein the security profile for the second domain is removed from the CDN instance in response to receiving a response from the domain security scaler confirming that second domain can be evicted.

At operation 635, the CDN instance obtains the security profile for the first domain.

At operation 640, the CDN instance provides the security profile for the first domain to a security solution implemented by the CDN instance.

At operation 645, the CDN instance updates the auto-adjusting list to remove the second domain and to add the first domain.

At operation 650, the CDN instance updates a domain map maintained by the CDN instance to include a mapping between the first domain and the security profile for the first domain. In an implementation, the domain map includes links between domains included in the domain map and domains included in the auto-adjusting list (e.g., as shown in FIG. 3).

Figure 6B:
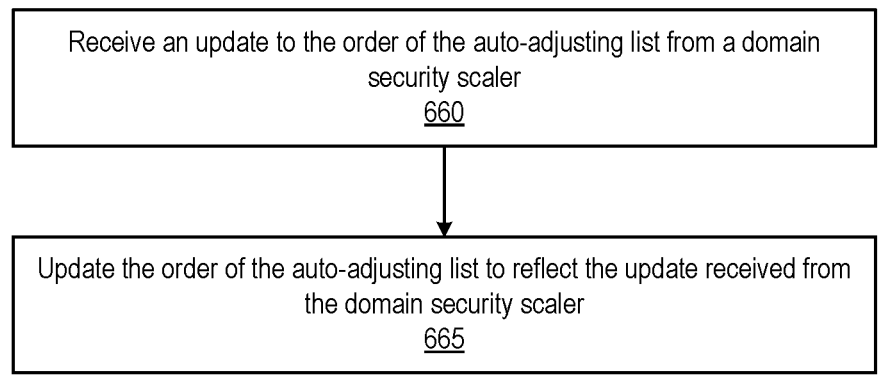
FIG. 6B is a flow diagram of a method for updating an auto-adjusting list maintained by a CDN instance, according to some implementations.

FIG. 6B is a flow diagram of a method for updating an auto-adjusting list maintained by a CDN instance, according to some implementations. In an implementation, the method is performed by a computing system that implements a CDN instance 120. The method may be performed using hardware, software, firmware, or any combination thereof.

At operation 660, the CDN instance receives an update to the order of the auto-adjusting list from a domain security scaler.

At operation 665, the CDN instance updates the order of the auto-adjusting list to reflect the update received from the domain security scaler. The CDN instance may perform operations 660 and 665 asynchronously alongside the operations shown in FIG. 6A (operations 605-650) to continually/periodically update the order of the auto-adjusting list.

Example Electronic Devices and Environments
Electronic Device and Machine-Readable Media One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, machine, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 7A:
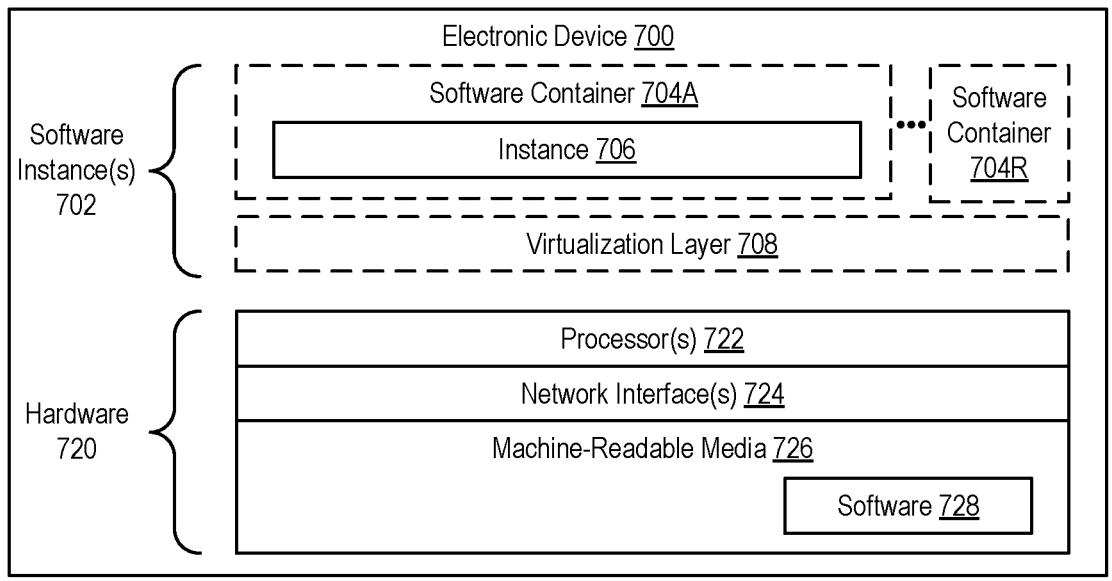
FIG. 7A is a block diagram showing an electronic device, according to some implementations.

FIG. 7A is a block diagram illustrating an electronic device 700 according to some example implementations. FIG. 7A includes hardware 720 comprising a set of one or more processor(s) 722, a set of one or more network interfaces 724 (wireless and/or wired), and machine-readable media 726 having stored therein software 728 (which includes instructions executable by the set of one or more processor(s) 722). The machine-readable media 726 may include non-transitory and/or transitory machine-readable medium/media. Each of the previously described CDN instances and domain security scaler may be implemented in one or more of electronic device 700. In one implementation: 1) each of the CDN instances is implemented in a separate one of the electronic device 700 (e.g., where the software 728 represents the software to implement a security profile manager 150 that can interface directly and/or indirectly with the domain security scaler 170); 2) the domain security scaler is implemented in a separate set of one or more of electronic device 700 (e.g., a set of one or more server devices where the software 728 represents the software to implement the domain security scaler 170); and 7) in operation, the electronic devices implementing the CDN instances and the domain security scaler would be communicatively coupled (e.g., by a network) and would establish between them (or through one or more other layers and/or or other services) connections for the CDN instances 120 to send security events to the domain security scaler 170 and for the domain security scaler 170 to send updates to the order of the auto-adjusting lists 140 of CDN instances 120 to those CDN instances 120. Other configurations of electronic devices may be used in other implementations (e.g., an implementation in which a CDN instance and the domain security scaler are implemented on a single one of electronic device 700).

During operation, an instance of the software 728 (illustrated as instance 706 and referred to as a software instance; and in the more specific case of an application, as an application instance) is executed. In electronic devices that use compute virtualization, the set of one or more processor(s) 722 typically execute software to instantiate a virtualization layer 708 and a set of one or more software containers, shown as software container 704A to software container 704R (e.g., with operating system-level virtualization, the virtualization layer 708 may represent a container engine (such as Docker Engine by Docker, Inc. or rkt in Container Linux by Red Hat, Inc.) running on top of (or integrated into) an operating system, and it allows for the creation of multiple software containers (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 728 is executed within the software container 704A on the virtualization layer 708. In electronic devices where compute virtualization is not used, the instance 706 on top of a host operating system is executed on the "bare metal" electronic device 700. Instances of the software 728, as well as the virtualization layer 708 and the software containers if implemented, are collectively referred to as software instance(s) 702.

Alternative implementations of an electronic device may have numerous variations from that described above. For example, customized hardware and/or accelerators might also be used in an electronic device.

Example Environment

Figure 7B:
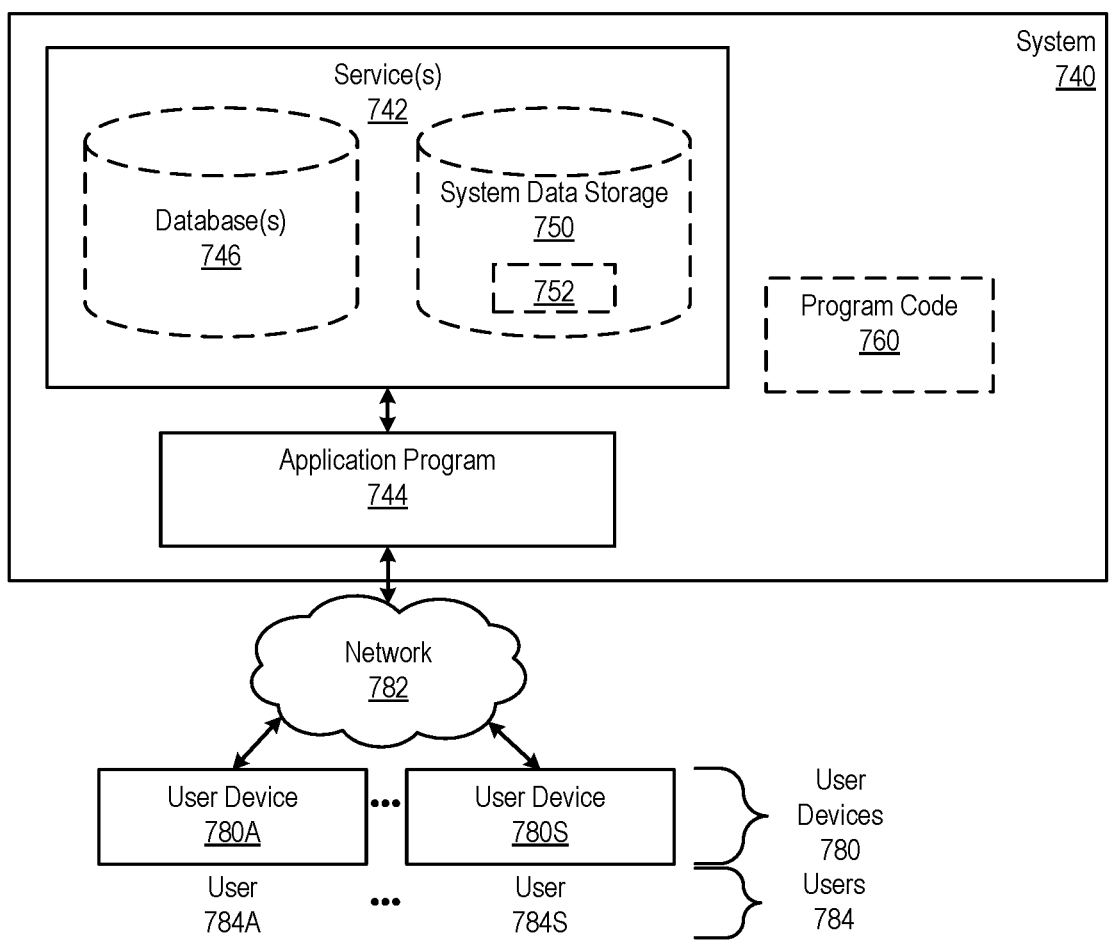
FIG. 7B is a block diagram showing a deployment environment, according to some implementations.

FIG. 7B is a block diagram of a deployment environment according to some example implementations. A system 740 includes hardware (e.g., a set of one or more server devices) and software to provide service(s) 742, including a domain security scaler service. In some implementations the system 740 is in one or more datacenter(s). These datacenter(s) may be: 1) first party datacenter(s), which are datacenter(s) owned and/or operated by the same entity that provides and/or operates some or all of the software that provides the service(s) 742; and/or 2) third-party datacenter(s), which are datacenter(s) owned and/or operated by one or more different entities than the entity that provides the service(s) 742 (e.g., the different entities may host some or all of the software provided and/or operated by the entity that provides the service(s) 742). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 740 is coupled to user devices 780 (shown as user device 780A to user device 780S) over a network 782. The service(s) 742 may be on-demand services that are made available to users 784 (shown as user 784A to user 784S) working for one or more entities other than the entity which owns and/or operates the on-demand services (those users sometimes referred to as outside users) so that those entities need not be concerned with building and/or maintaining a system, but instead may make use of the service(s) 742 when needed (e.g., when needed by the users). The service(s) 742 may communicate with each other and/or with one or more of the user devices 780 via one or more APIs (e.g., a REST API). In some implementations, the user devices 780 are operated by the users 784, and each may be operated as a client device and/or a server device. In some implementations, one or more of the user devices 780 are separate ones of the electronic device 700 or include one or more features of the electronic device 700. In an implementation, the users 784 are administrators of CDNs and they can operate their respective user devices 780 to configure and manage a domain security scaler service provided by the system 740.

In some implementations, the system 740 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant typically includes a group of users with access to at least some of the same data/functionality with the same or similar privileges/permissions. Tenants may be different entities (e.g., different companies, different departments/divisions of a company, and/or other types of entities), and some or all these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third-party application developers providing applications/services and another set of tenants may be customers of different ones or all the third-party application developers.

Multi-tenancy can be implemented in different ways. In some implementations, a multi-tenant architecture may include software instance(s) that are shared by multiple tenants (e.g., a single database instance share by multiple tenants, sometime referred to as a multi-tenant database; a single application instance shared by multiple tenants, sometimes referred to as a multi-tenant application; a single application instance and a single database instance shared by multiple tenants; an application instance per tenant and a database instance shared by multiple tenants; a single application instance share by multiple tenants and a database instance per tenant).

In one implementation, the system 740 is a multi-tenant cloud computing architecture supporting multiple services, such as one or more of the following types of services: domain security scaler service; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 740 may include an application platform 744 that enables PAAS for creating, managing, and executing one or more applications developed by the provider of the application platform 744, users accessing the system 740 via one or more of the user devices 780, or third-party application developers accessing the system 740 via one or more of user devices 780.

In some implementations, one or more of the service(s) 742 may use one or more database(s) 746 and/or system data storage 750 (which stores system data 752). In certain implementations, the system 740 includes a set of one or more servers that are running on server electronic devices and that are configured to handle requests for any authorized user associated with any tenant (there is no server affinity for a user and/or tenant to a specific server). The user devices 780 communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the database(s) 746 and/or system data storage 750.

In some implementations, the service(s) 742 are implemented using virtual applications dynamically created at run time responsive to queries from the user devices 780 and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the domain security scaler service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a $7^{rd}$ Generation Partnership Project (7GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 740 and the user devices 780.

Each of the user devices 780 (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 740. For example, the user interface device can be used to access data and applications hosted by system 740, and to perform searches on stored data, and otherwise allow one or more of users 784 to interact with various GUI pages that may be presented to the one or more of users 784. The user devices 780 may communicate with system 740 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more the user devices 780 may include an HTTP client, commonly referred to as a "browser," for sending and receiving HTTP messages to and from server(s) of system 740, thus allowing one or more of the users 784 to access, process and view information, pages and applications available from system 740 over network 782.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

The figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the above description includes several example implementations, the invention is not limited to the implementations described and can be practiced with modification and alteration within the spirit and scope of the appended claims. The description is thus illustrative instead of limiting.

What is claimed is:

1. A method performed by a computing system to manage domain-based security profiles in a content delivery network (CDN), the method comprising:
  receiving security events detected by one or more security solutions implemented by one or more CDN instances of the CDN;
  determining, for each of a plurality of domains, a risk score for the domain based on the security events;
  determining possible next level domains for a CDN instance of the CDN, wherein the CDN instance maintains a domain map that includes mappings between domains and security profiles for those domains and an auto-adjusting list that includes the domains included in the domain map, an order of the auto-adjusting list indicating an eviction priority for the domains included in the auto-adjusting list;
  determining an updated order of the auto-adjusting list based on risk scores for the domains included in the auto-adjusting list and the possible next level domains for the CDN instance; and
  sending an update to the CDN instance to cause the CDN instance to update the order of the auto-adjusting list to reflect the updated order.

2. The method of claim 1, wherein determining the risk score for a domain from the plurality of domains comprises:
  extracting security event parameters from security events associated with the domain and applying risk scoring rules to the security event parameters.

3. The method of claim 1, wherein determining the possible next level domains for the CDN instance comprises:
  rendering a web application associated with a domain accessed via the CDN instance; and
  determining domains that can be reached from the rendered web application.

4. The method of claim 3, wherein the possible next level domains include more than one level of possible next level domains.

5. The method of claim 1, further comprising:
  sending a default security profile to the CDN instance.

6. A method performed by a computing system implementing a content delivery network (CDN) instance of a CDN to manage domain-based security profiles in the CDN instance, the method comprising:
  receiving traffic associated with a first domain;
  determining whether a security profile for the first domain is available within the CDN instance;
  responsive to determining that the security profile for the first domain is not available within the CDN instance, applying security actions to the traffic associated with the first domain in accordance with a default security profile;
  selecting a second domain to be evicted from the CDN instance based on accessing an auto-adjusting list of domains maintained by the CDN instance, wherein an order of the auto-adjusting list indicates an eviction priority for the domains included in the auto-adjusting list;

removing a security profile for the second domain from the CDN instance;

obtaining the security profile for the first domain;

providing the security profile for the first domain to a security solution of the CDN instance;

updating the auto-adjusting list to remove the second domain and to include the first domain; and updating a domain map maintained by the CDN instance to include a mapping between the first domain and the security profile for the first domain.

7. The method of claim 6, further comprising:

receiving further traffic associated with the first domain; and responsive to determining that the security profile for the first domain is available within the CDN instance, applying security actions to the further traffic associated with the first domain in accordance with the security profile for the first domain.

8. The method of claim 6, further comprising:

receiving an update to the order of the auto-adjusting list from a domain security scaler; and updating the order of the auto-adjusting list to reflect the update received from the domain security scaler.

9. The method of claim 6, further comprising:

sending a request to a domain security scaler to confirm that the second domain can be evicted, wherein the security profile for the second domain is removed from the CDN instance in response to receiving a response from the domain security scaler confirming that second domain can be evicted.

10. The method of claim 6, wherein the domain map includes links between domains included in the domain map and domains included in the auto-adjusting list.

11. A non-transitory machine-readable storage medium that provides instructions that, if executed by a processor of a computing system, are configurable to cause said computing system to perform operations for managing domain-based security profiles in a content delivery network (CDN), the operations comprising:

receiving security events detected by one or more security solutions implemented by one or more CDN instances of the CDN;

determining, for each of a plurality of domains, a risk score for the domain based on the security events;

determining possible next level domains for a CDN instance of the CDN, wherein the CDN instance maintains a domain map that includes mappings between domains and security profiles for those domains and an auto-adjusting list that includes the domains included in the domain map, an order of the auto-adjusting list indicating an eviction priority for the domains included in the auto-adjusting list;

determining an updated order of the auto-adjusting list based on risk scores for the domains included in the auto-adjusting list and the possible next level domains for the CDN instance; and sending an update to the CDN instance to cause the CDN instance to update the order of the auto-adjusting list to reflect the updated order.

12. The non-transitory machine-readable storage medium of claim 11, wherein determining the risk score for a domain from the plurality of domains comprises:

extracting security event parameters from security events associated with the domain and applying risk scoring rules to the security event parameters.

13. The non-transitory machine-readable storage medium of claim 11, wherein determining the possible next level domains for the CDN instance comprises:

rendering a web application associated with a domain accessed via the CDN instance; and determining domains that can be reached from the rendered web application.

14. The non-transitory machine-readable storage medium of claim 13, wherein the possible next level domains include more than one level of possible next level domains.

15. The non-transitory machine-readable storage medium of claim 11, wherein the operation further comprise:

sending a default security profile to the CDN instance.

16. A non-transitory machine-readable storage medium that provides instructions that, if executed by a processor of a computing system implementing a content delivery network (CDN) instance, are configurable to cause said CDN instance to perform operations for managing domain-based security profiles in the CDN instance, the operations comprising:

receiving traffic associated with a first domain;

determining whether a security profile for the first domain is available within the CDN instance;

responsive to determining that the security profile for the first domain is not available within the CDN instance, applying security actions to the traffic associated with the first domain in accordance with a default security profile;

selecting a second domain to be evicted from the CDN instance based on accessing an auto-adjusting list of domains maintained by the CDN instance, wherein an order of the auto-adjusting list indicates an eviction priority for the domains included in the auto-adjusting list;

removing a security profile for the second domain from the CDN instance;

obtaining the security profile for the first domain;

providing the security profile for the first domain to a security solution of the CDN instance;

updating the auto-adjusting list to remove the second domain and to include the first domain; and updating a domain map maintained by the CDN instance to include a mapping between the first domain and the security profile for the first domain.

17. The non-transitory machine-readable storage medium of claim 16, wherein the operations further comprise:

receiving further traffic associated with the first domain; and responsive to determining that the security profile for the first domain is available within the CDN instance, applying security actions to the further traffic associated with the first domain in accordance with the security profile for the first domain.

18. The non-transitory machine-readable storage medium of claim 16, wherein the operations further comprise:

receiving an update to the order of the auto-adjusting list from a domain security scaler; and updating the order of the auto-adjusting list to reflect the update received from the domain security scaler.

19. The non-transitory machine-readable storage medium of claim 16, further comprising:

sending a request to a domain security scaler to confirm that the second domain can be evicted, wherein the security profile for the second domain is removed from the CDN instance in response to receiving a response from the domain security scaler confirming that second domain can be evicted.

20. The non-transitory machine-readable storage medium of claim 16, wherein the domain map includes links between domains included in the domain map and domains included in the auto-adjusting list.

\* \* \* \* \*